Aug. 31, 1943.  H. C. BRIGGS  2,327,994
MECHANISM FOR IMPROVING THE DIRIGIBILITY OF
SHIPS, SUBMARINES, AND AIRCRAFT
Filed Nov. 6, 1939  8 Sheets-Sheet 1
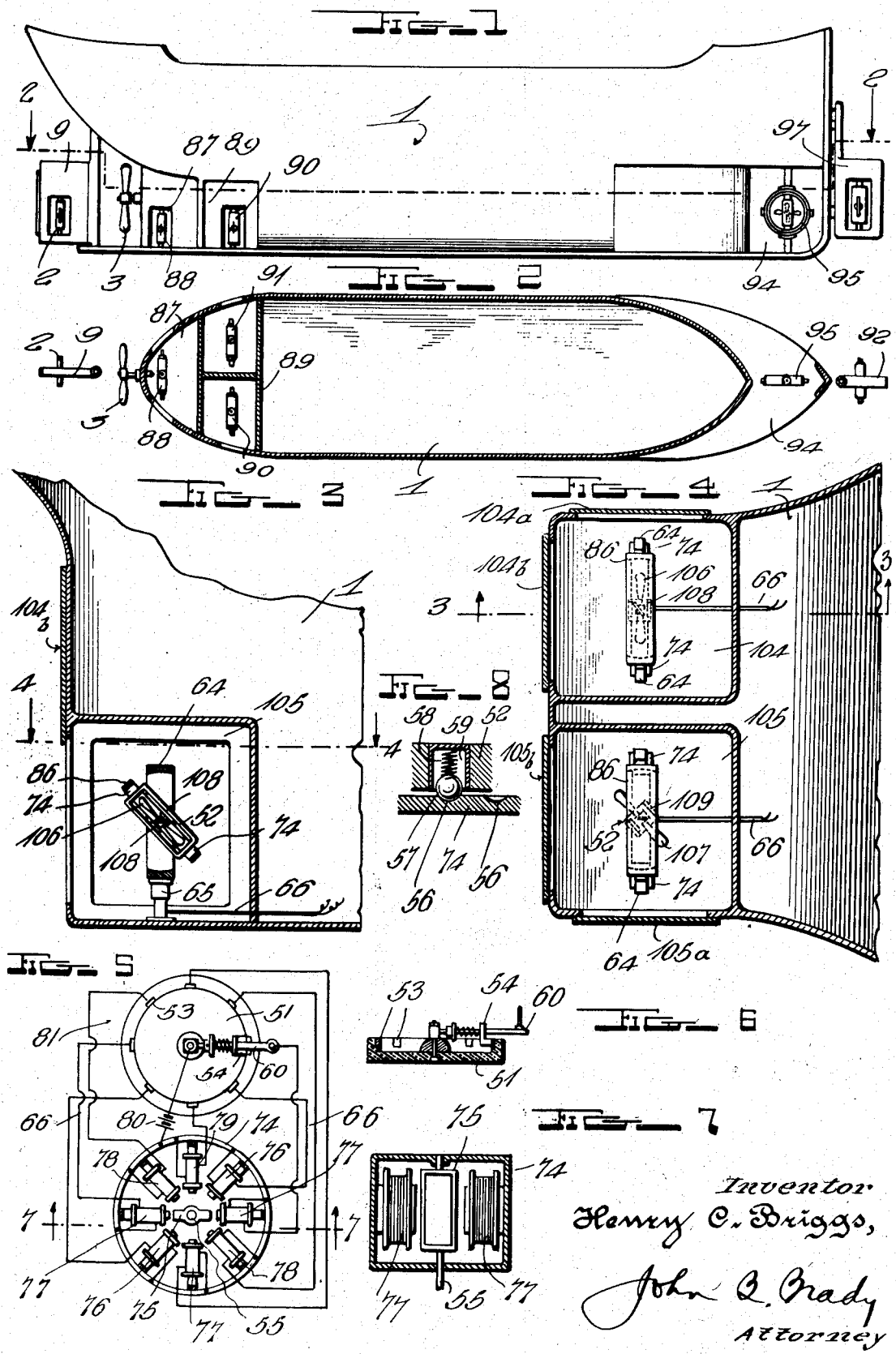
Inventor
Henry C. Briggs,
John Q. Brady
Attorney

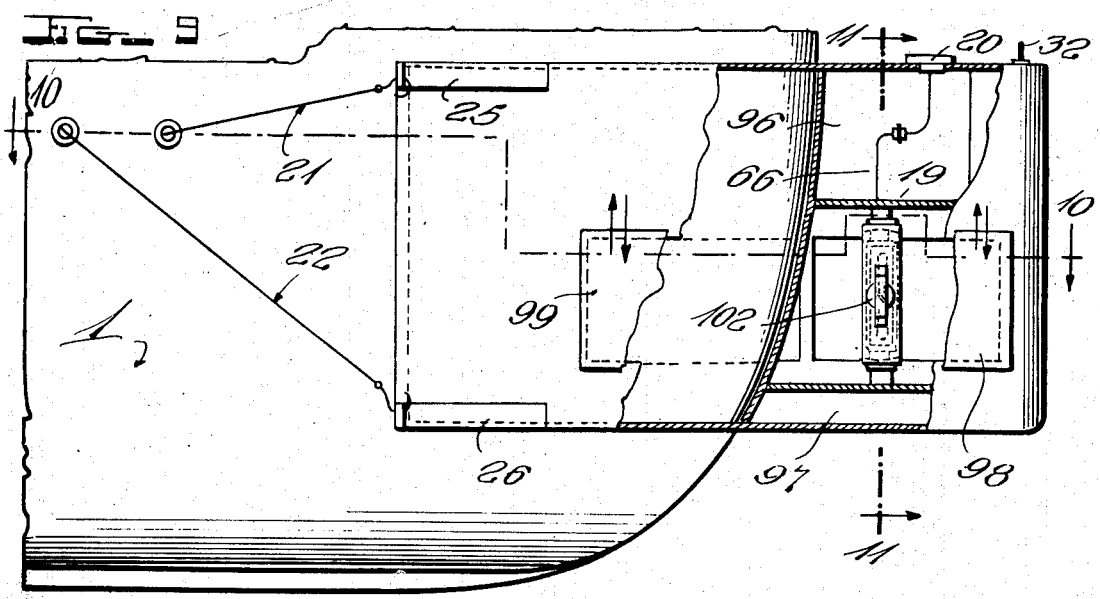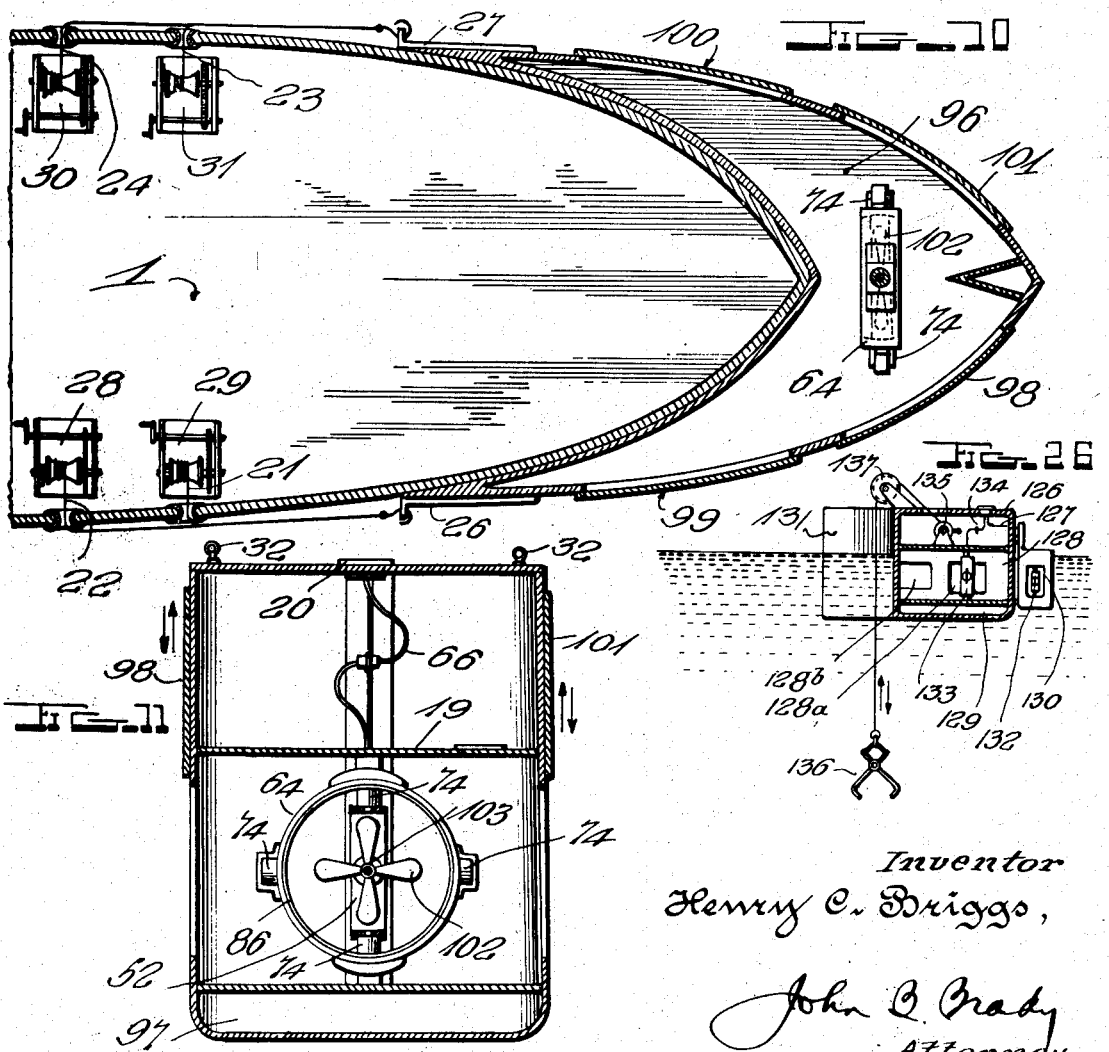

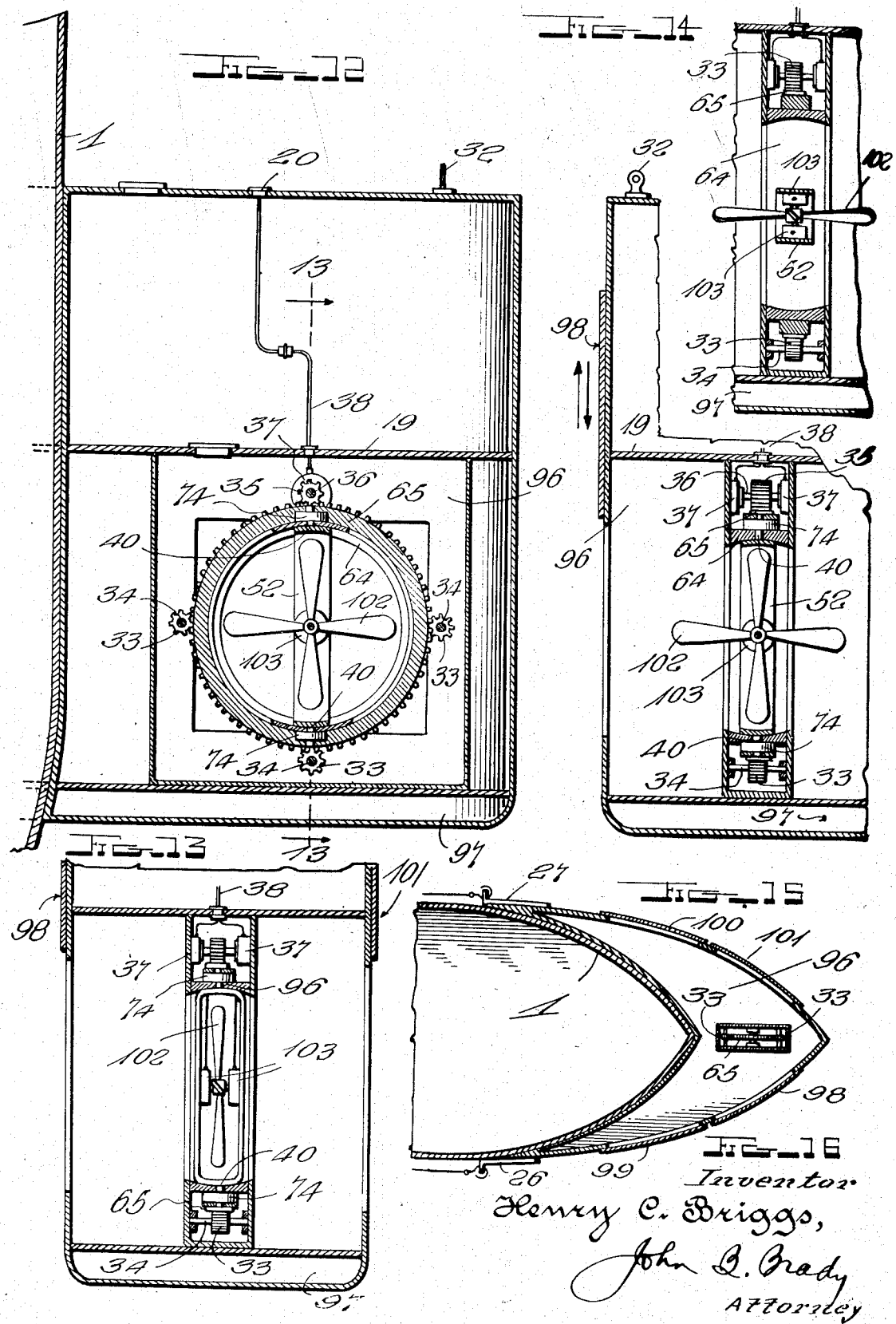

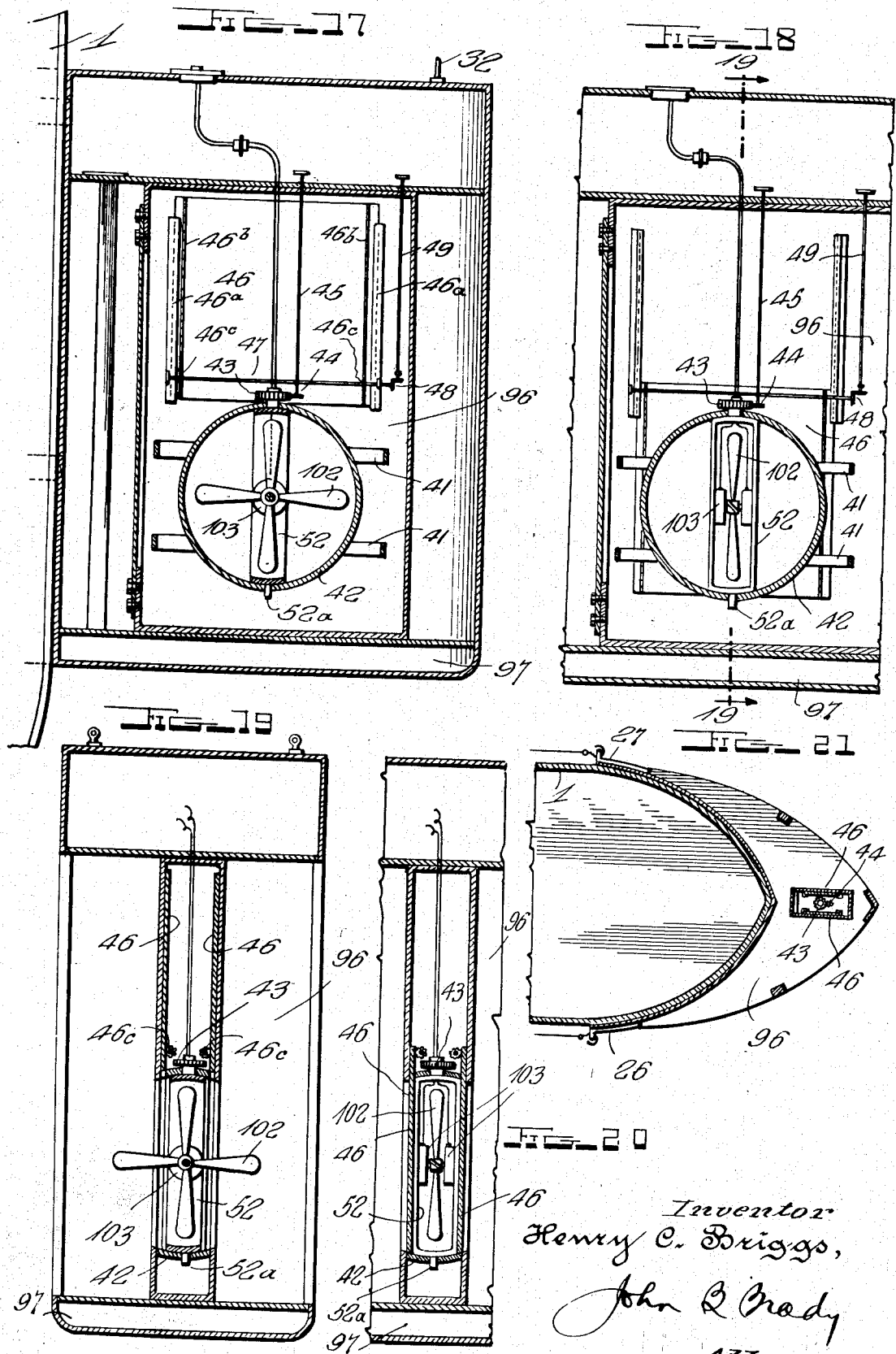

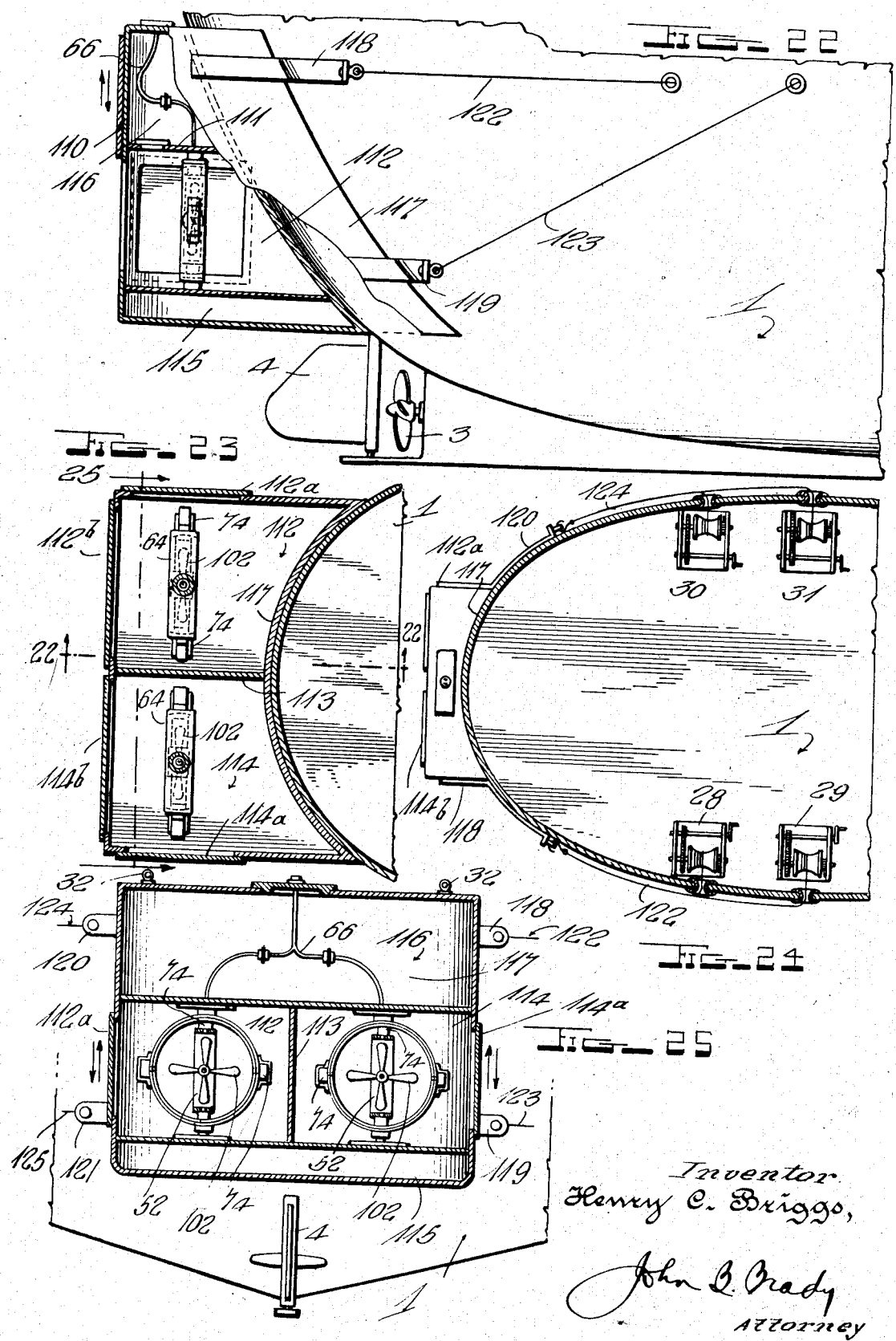

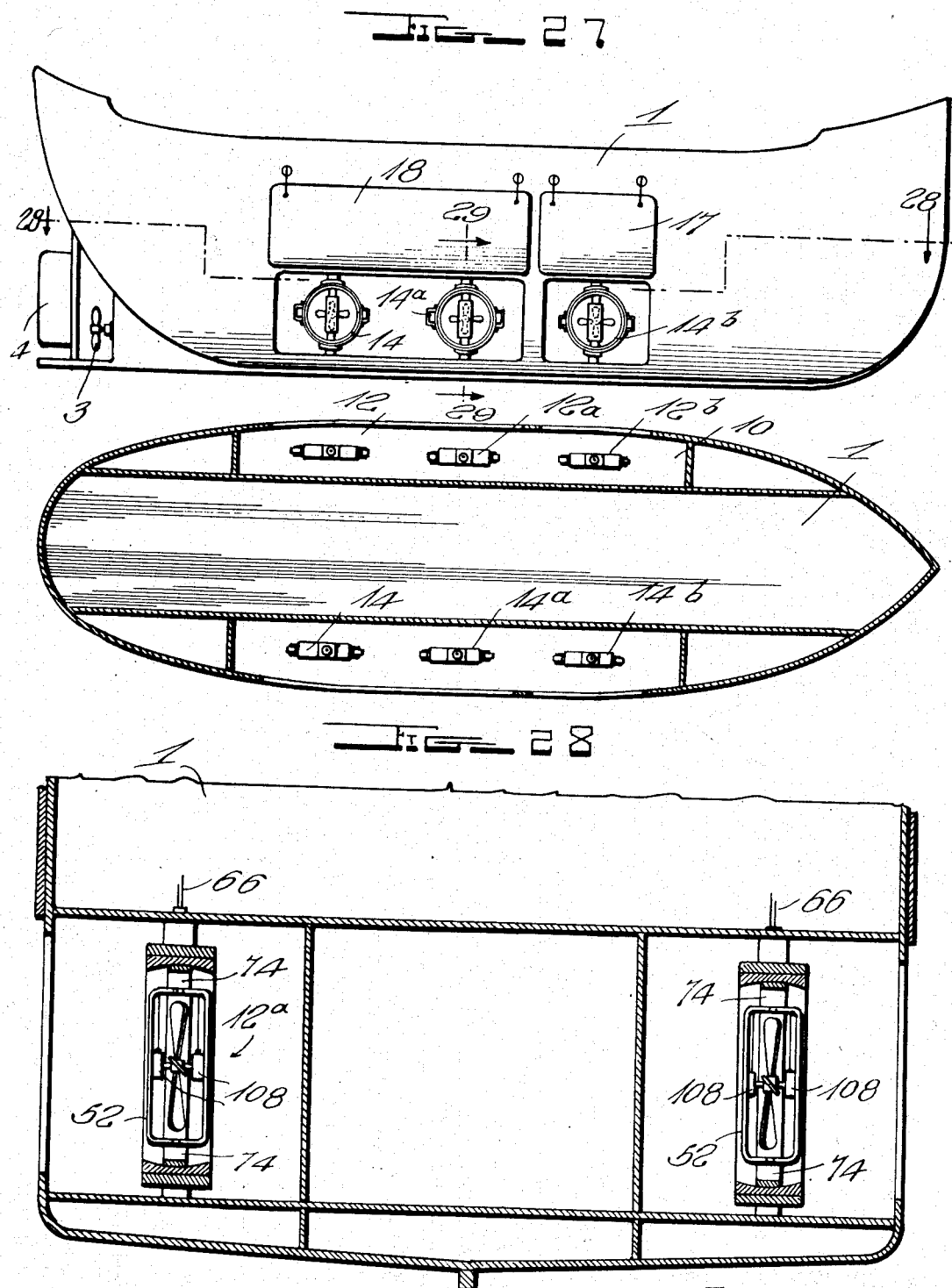

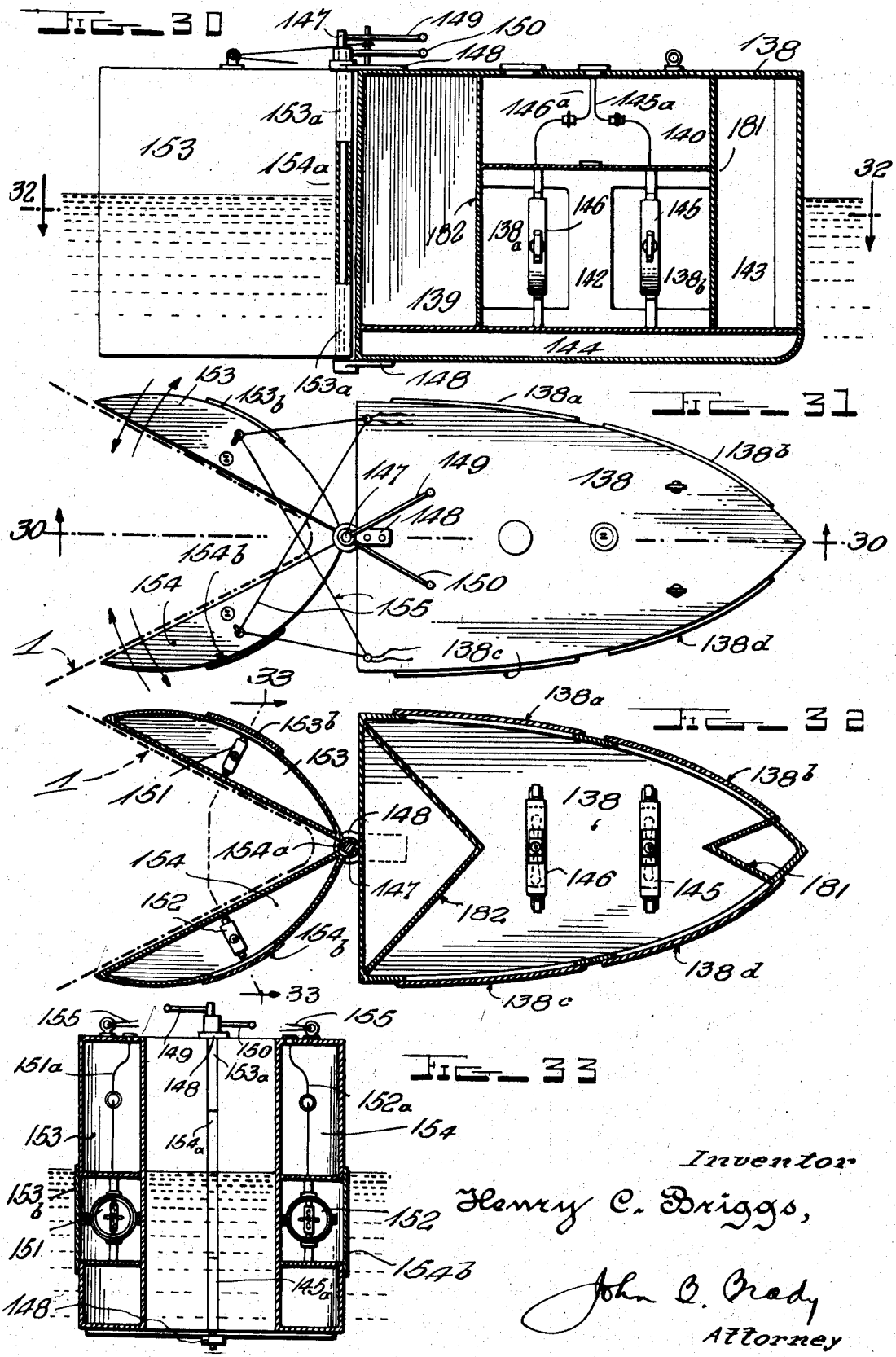
Aug. 31, 1943.   H. C. BRIGGS   2,327,994
MECHANISM FOR IMPROVING THE DIRIGIBILITY OF
SHIPS, SUBMARINES, AND AIRCRAFT
Filed Nov. 6, 1939   8 Sheets-Sheet 7
Inventor
Henry C. Briggs,
John C. Brady
Attorney

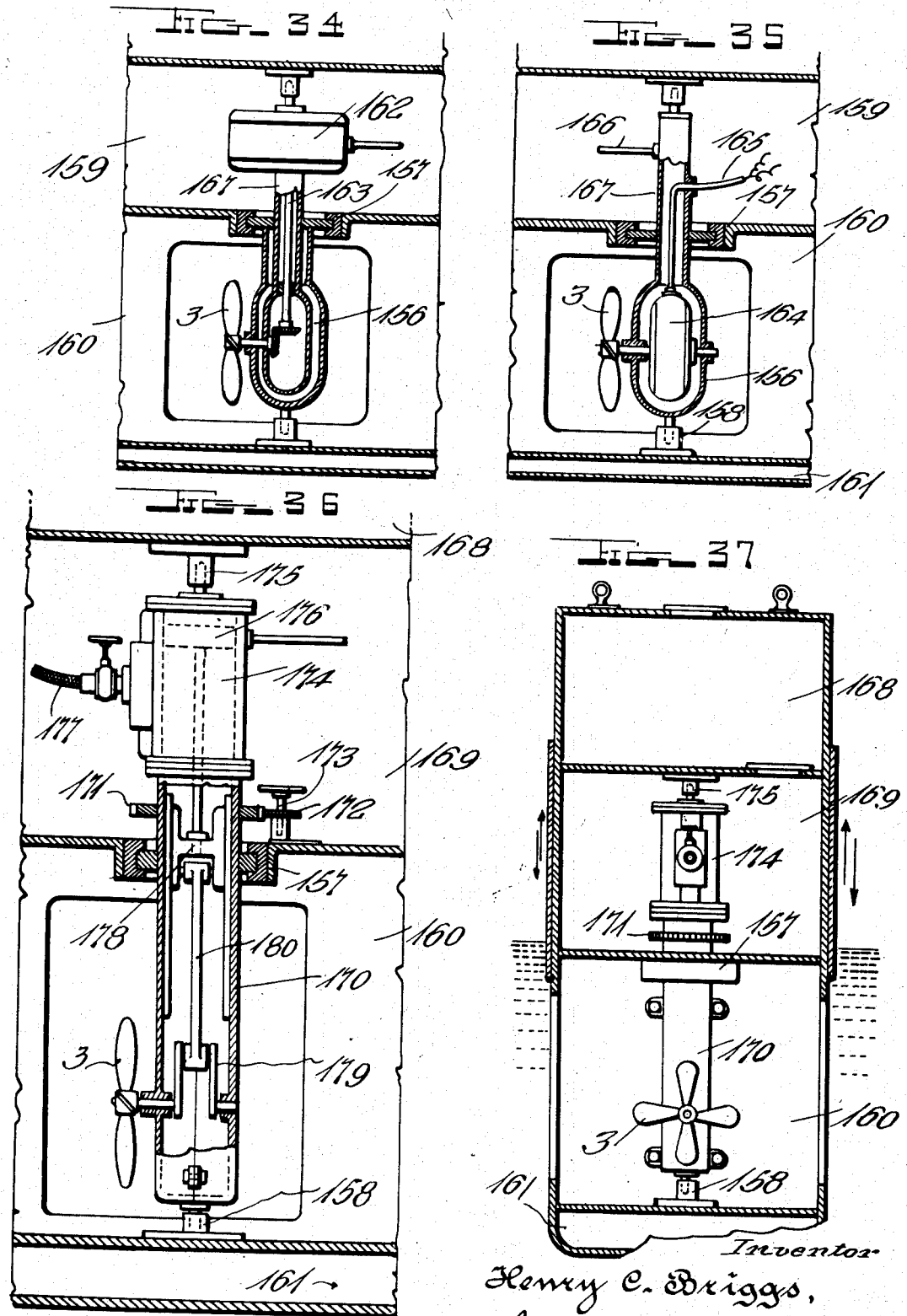

Patented Aug. 31, 1943

2,327,994

UNITED STATES PATENT OFFICE 2,327,994

MECHANISM FOR IMPROVING THE DIRIGIBILITY OF SHIPS, SUBMARINES, AND AIRCRAFT

Henry C. Briggs, Brooklyn, N. Y.

Application November 6, 1939, Serial No. 303,130

2 Claims. (Cl. 115—35)

My invention relates broadly to nagivation of ships, submarines and aircraft and more particularly to safety mechanism for improving the dirigibility of ships, submarines, and aircraft.

This application is a continuation-in-part of my application Serial Number 105,112, filed October 10, 1936, for Safety mechanism for improving the dirigibility of ships, submarines, and aircraft, now Patent No. 2,178,855, issued November 7, 1939.

One of the objects of my invention is to provide an improved construction of navigation control mechanism by which steering of large vessels, submarine boats, and aircraft may be facilitated.

Another object of my invention is to provide a method of constructing a vessel having means associated with compartments in the vessel for displacing the fluid medium at positions along the vessel for facilitating the navigation of the vessel.

A further object of my invention is to provide an arrangement of maneuvering apparatus for vessels by which added driving power and extra speed may be obtained by the use of auxiliary propulsion means normally housed in streamline arrangement in compartments along the vessel.

Still another object of my invention is to provide an arrangement of maneuvering apparatus for vessels in which propellers are disposed in compartments along the vessel in the bow, sides, in the stern, or in the bottom of the hull with streamline doors arranged to open or close the compartments for the admission or discharge of the fluid medium through which the vessel is propelled.

A still further object of my invention is to provide a system of orientable propellers disposed in compartments in a vessel and controllable from the pilot's position in the vessel for directing maneuvering forces in selected directions.

Another object of my invention is to provide a construction of marine tractor attachable in a selected position to the hull of a vessel for facilitating propulsion of the vessel.

Still another object of my invention is to provide a floatable body useful in marine salvage operations, shaped to receive a portion of the hull of a ship and provided with driving means for imparting both buoyancy and propulsion forces to the ship.

Other and further objects of my invention reside in the arrangement of auxiliary propulsion mechanism for ships as set forth more fully in the specification hereinafter following by reference to the accompanying drawings in which:

Figure 1 is a side elevational view of a ship showing the application of the system of my invention thereto; Fig. 2 is a longitudinal sectional view taken on line 2—2 of Fig. 1 with the orienting propellers, rudders and main propulsion system illustrated in top plan view; Fig. 3 is a fragmentary sectional view on line 3—3 of Fig. 4 showing one of the orienting propellers of my invention in a compartment at the stern of a vessel; Fig. 4 is a transverse sectional view on line 4—4 of Fig. 3 showing port and starboard orienting propellers at the stern of a vessel; Fig. 5 is a schematic and diagrammatic view of one form of remote control system for the orienting propellers of my invention; Fig. 6 is a transverse sectional view of the control switch disposed at the pilot's position for remotely controlling the angular position of the orienting propellers; Fig. 7 is a transverse sectional view taken through one of the orientation control boxes provided for the orientable propellers of my invention; Fig. 8 is a view of one form of mechanism for retaining the orientable propellers in a selected position when once set in such position by remote control; Fig. 9 is a side elevational view partially in section showing the attachment of a marine tractor to the bow of a vessel embodying an orientable propeller mechanism in accordance with my invention; Fig. 10 is a transverse sectional view taken substantially on line 10—10 of Fig. 9 and showing certain of the parts in elevational; Fig. 11 is a vertical sectional view taken on line 11—11 of Fig. 9; Fig. 12 is a longitudinal sectional view taken through a modified form of marine tractor showing a modified form of three dimensional orientation mechanism for propelling means located within a compartment of the tractor; Fig. 13 is a vertical transverse sectional view on line 13—13 of Fig. 12; Fig. 14 is a fragmentary sectional view showing the propulsion mechanism oriented within the compartment of the structure shown in Figs. 12 and 13; Fig. 15 shows the propelling mechanism moved to a transverse plane within a compartment of the marine tractor; Fig. 16 is a fragmentary longitudinal sectional view showing the manner of attachment of the floatable body constituting the marine tractor to the bow of the vessel and showing the propulsion means set in a selected orientation plane therein; Fig. 17 is a longitudinal sectional view through a floatable body showing a modified form of orientation means for the propulsion mechanism and means for controlling the ingress and egress of sea water with respect to the propulsion means; Fig. 18 is a view similar to Fig. 17 but showing the sea water excluding means in closed position; Fig. 19 is a transverse sectional view taken on line 19—19 of Fig. 18 showing the sea water excluding means open; Fig. 20 is a transverse sectional view showing the propulsion mechanism oriented to a housed position with the sea water excluding means closed; Fig. 21 is a fragmentary transverse sectional view showing the relationship of the orientable propulsion mechanism with respect to the bow of the vessel; Fig. 22 is a side elevational view of a marine tractor embodying my invention attached to the stern of a vessel; Fig. 23 is a transverse sectional view taken through the marine tractor shown in Fig. 22; Fig. 24 is a schematic view showing the arrangement of attachment means for the marine tractor at the stern of a vessel; Fig. 25 is a transverse sectional view taken through the marine tractor at the stern of a vessel substantially on line 25—25 of Fig. 23; Fig. 26 illustrates the application of my invention to a marine tractor constructed particularly for salvage operations; Fig. 27 shows the application of my invention to compartments in the amidship section of a vessel; Fig. 28 is a longitudinal sectional view taken substantially on line 28—28 of Fig. 27; Fig. 29 is a transverse sectional view showing the arrangement of the orientation propelling mechanism in compartments on the port and starboard sides of a vessel. the view being taken substantially on line 29—29 of Fig. 27; Fig.30 is a longitudinal sectional view of a modified form of marine tractor associated with attachment means engageable with a vessel, the view being taken substantially on line 30—30 of Fig. 31; Fig. 31 is a plan view of the tractor and attachment means illustrated in Fig. 30; Fig. 32 is a longitudinal sectional view taken through the marine tractor and attachment means on line 32—32 of Fig. 30; Fig. 33 is a sectional view taken substantially on line 33—33 of Fig. 32; Fig. 34 shows one method of remotely driving the orientable propelling mechanism of my invention using a system of shafts and gears; Fig. 35 shows an arrangement of electric motor drive for the orientable propelling system of my invention; Fig. 36 illustrates an arrangement of steam engine drive for the propelling mechanism; and Fig. 37 is a detailed elevational view with parts shown in section illustrating more clearly the steam engine drive and the manner of mounting the drive for allowing orientation of the propelling mechanism within a compartment of a floatable body.

I provide means auxiliary to the main propulsion means of the vessel for providing additional driving power for the vessel for facilitating maneuvering of the vessel. I provide compartments below the waterline in the bow or stern of the vessel or along the vessel. Propulsion means are provided within the compartments. Streamline doors are provided to open and close portions of the compartments for allowing ingress and egress of the water through which the vessel is propelled. The streamline doors may be constructed from armor plate for affording maximum protection to the propulsion means. The propulsion means are suitably orientable within the compartments in order to impart maximum effectiveness to the propulsion means. I may drive the propulsion means through electric motors or through suitable transmission mechanism within the vessel. My invention contemplates generally the arrangement of compartments in the bow, stern, skeg, or amidship section of the vessel within which I provide propelling mechanism. The propelling means is orientable by remote control from the pilot's position in the vessel to impart driving forces in selected directions and planes. The propelling mechanism may be mounted in a floatable body which is shaped to facilitate attachment of the body to the hull of a vessel. The system of my invention is adaptable to salvaging operations in which a floatable body equipped in accordance with the principles of my invention is attachable to the hull of a vessel to be salvaged. Various forms of orienting propellers within compartments, either in the ship proper or in a marine tractor or floatable body attachable to the hull of a vessel are embraced by my invention.

The propelling mechanism may be located in various positions with respect to the hull of the vessel. For example, as illustrated in Figs. 1 and 2, the propelling mechanism may be housed in the hollow rudder 9 with respect to the hull of the vessel 1, and coordinated for operation with respect to the main propeller 3 and, in addition, other maneuvering propellers may be provided. The hollow rudder 9 is shown housing the orientable propelling mechanism 2 remotely controllable from the pilot's position in the vessel. In order to illustrate the several embodiments of my invention I have illustrated in Figs. 1 and 2, an auxiliary propeller compartment in the skeg, as shown at 87 in Fig. 1, in which auxiliary propeller 88 is housed. To further facilitate the maneuverability of the vessel, I may provide one or more compartments 89 in the stern of the vessel in which a pair of auxiliary propellers 90 and 91 are symmetrically arranged. Moreover, a rudder may be provided forward of the vessel, as indicated at 92. For additional control of the vessel, a compartment may be provided in the prow of the vessel, as indicated at 94, in which auxiliary propeller 95 is located. The compartments described are suitably apertured for the passage of the sea water, or fluid medium in the case of aircraft, against which the propulsion forces are rendered effective. It will be understood that separate controls extend from the several auxiliary propellers to the control position aboard the vessel and the operation coordinated so that the maneuvering of a vessel of large size, is greatly simplified. A vessel of large size, of the order of 37,000 tons, driven by 200,000 horse power engines may be maneuvered quickly and within a smaller area to change the course of the vessel, thus increasing the safety of life and property.

In Figs. 3 and 4, I have shown methods of arranging the auxiliary propellers in separate compartments in spaced positions in the vessel. In Fig. 3 I have illustrated the manner in which the propeller 106 may be oriented to a position tending to exert a thrust angularly downward through the pocket-like compartment.

In Fig. 4 I have shown port propeller 106 in normal position within the pocket-like compartment 104 while the starboard propeller 107 is oriented to an angular position tending to exert a thrust outwardly at an angle to the vessel in a substantially horizontal plane through both ports uncovered by door closures 105a and 105b. The orientation positions illustrated are merely for the purpose of describing my invention and it will be understood that the propellers may be moved to various positions for maneuvering the vessel. In order to provide the required or desired thrusts, the propellers may be arranged within the pocket-like compartments in a variety of positions. The orientation mechanism is applicable generally to all installations of the propeller mechanisms set forth herein including the attachable compartment construction hereinafter described.

Compartments 104 and 105 may be suitably located adjacent the stern of vessel 1. Port compartment 104 may be suitably located adjacent the stern of vessel 1. Port compartment 104 and starboard compartment 105 may each be provided with separate streamline door closures 104a and 104b, 105a, and 105b which may be opened or closed by remote control. The compartments 104 and 105 are watertight and may be selectively employed in the maneuvering of the vessel by the selective operation of the auxiliary orientable propellers 106 and 107. Propellers 106 and 107 are operated by suitable drives 108 and 109, controlled from the control position aboard the vessel. I may locate these compartments in spaced positions at the bow, in the sides, in the stern or in the bottom of the hull of the vessel.

The propeller 106 is mounted on a shaft member driven by suitable drives 108. The drives 108 may be electric motors carried by the angularly shiftable frame 52 as shown. The frame 52 is secured at opposite ends to shafts which extend into orientation control boxes 74. The orientation control boxes 74 are supported in a ring-like member 86 which is angularly shiftable under control of shafts which project from orientation control boxes 74 supported with respect to frame 64. Frame 64 is provided with a suitably shaped interior face to allow angular displacement of ring-like member 86 under control of the orientation mechanism. Frame 64 is suitably mounted in the pocket-like compartments in the vessel by means of suitable standard 65 through which a multiple conductor cable 66 may extend to the orientation control mechanism located at any desired position on shipboard.

The orientation control mechanism may be constructed in various forms and details are not material. The orientation control boxes 74 may also take various forms and details are not material to the invention herein. Figs. 5, 6, 7 and 8 show one form of the orientation control boxes 74 and the orientation control mechanism. The orientation control boxes contain sets of diametrically opposed electro-magnets 76, 77, 78 and 79 radially disposed and directed inwardly for magnetically controlling the position of bar magnet 75 secured to shaft 55 according to the set of electro-magnets which are selectively energized. The orientation control mechanism located at any desired remote control position includes selectively operative switch 81, having sets of contacts connected in series respectively with sets of electro-magnets 76, 77, 78 and 79 through a suitable source of potential shown at 80 connected with the circuit of leads 66. The remote control mechanism by which magnet 75 is angularly shifted is shown in Figs. 5 and 6 as comprising an insulated support 51 carrying an annular row of contacts 53 over which spring controlled contactor 54, carried by manually and selectively shiftable arm 60, is pivotally mounted. By grasping the end of arm 60 and shifting the arm to establish selective connection between contactor 54 and a selected contact 53, the circuit to selected magnets in orientation control box 74 may be completed. The magnet 75 when shifted by magnetic attraction to a selected position correspondingly shifts shaft 55 through the same angular distance and is latched in the selected position by a suitable spring actuated detent such as shown in Fig. 8. The control box casing 74 is provided with suitably spaced recesses 56 into which spring pressed detent 57 is forced under pressure of spring 58, suitably confined in position by tubular member 59 seated in frame 52. As each succeeding step by step movement of the frame is effected the detent is forced out of its seat and engages the next succeeding seat in alignment with the controlling electro-magnets which are selectively energized. A similar latch mechanism may be applied between ring-like member 86 and frame 64 for maintaining the ring-like member in rigid position when the ring-like member has been angularly shifted to that position.

The compartments may be contained in a structure which is demountably connected to the prow of the vessel as represented in Figs. 9-21 in the form of a marine tractor. The lower portion of the hull 1 is shown with the floatable structure of my invention attachable to the hull. The compartment 96 is watertight and has a substantially wedge-like inner bulkhead which cuts the water as it comes from the auxiliary propellers and throws it to the sides. The bulkhead however may extend laterally of the vessel or be provided with some other convenient shape. I provide a pair of streamline door closures 98 and 99 at the starboard side of the compartment 96 and a pair of door closures 100 and 101 at the port side of the compartment 96. These doors are operative through controls similar to the controls shown in connection with the sliding doors in the form of my invention shown in Figs. 17 and 18. Within the compartment 96, I mount one or more auxiliary orientable propellers as represented at 102 and drive the propellers in a manner similar to a method of drive heretofore explained, such as through motors 103, or by direct mechanical means. A single door may be provided at each side of the compartment, if desired. And should the auxiliary propellers be employed in practically continuous service, I may omit the doors altogether. Various components of maneuvering forces may be obtained by coordinating the drive of the auxiliary orientable propellers when two or more such propellers are employed.

The demountable structure shown in Figs. 9-21 is shaped to conform with a portion of the hull of a vessel and is divided into upper and lower compartments by horizontally extending partition 19 which forms the bottom of a watertight floatable section of the demountable structure. A lower floatable section 97 is provided to increase buoyancy of the structure. Cables 66 pass through the upper compartment from the orientation control mechanism and lead through insulator 20 to the pilot's position on the vessel from which the orientation may be controlled. As shown in Figs. 9-11, cables or chains 21, 22, 23 and 24, extend from hooks that engage lugs 25, 26, 27, etc., secured to the floatable structure and are reeled in through ports in the vessel upon windlasses 28, 29, 30 and 31 within the hull of the vessel and secured. Suitable lugs 32 are provided for securing a grip on the floatable body and moving it into position for attachment to the hull 1.

In Figs. 12-15, I have shown a three dimensional orientation system for the propelling mechanism in which a substantially universal adjustment of the propeller 102 operated by driving motors 103 is possible. In this arrangement I provide an annular frame 64 serving as a mounting means for the shiftable frame carrier 52. The annular frame 64 is connected with the rotatable gear structure 65 which is mounted for rotary adjustment interiorly of the compartment 96. I provide stabilizing pinions 33 mounted on shaft members 34 which are journaled laterally of compartment 96. The stabilizing pinions 33 mesh with the gear teeth formed on the perimeter of the rotatable gear 65. Rotary movement is imparted to gear 65 by means of a drive gear 35 which is carried by a shaft 36, which is in turn driven by motors 37 mounted interiorly of the compartment 96. It will be observed that conductors 38 extend from motors 37 for controlling the electrical energy supplied to motors 37 from the control position. An arrangement of sliding doors 98—101 is provided for closing the apertures in the hollow compartment 96. The mechanism for operating sliding doors 98—101 is similar to the mechanism shown and described in connection with the construction shown in Figs. 17-21.

Movement of the rotatable gear 65 permits the adjustment of propeller 102 through a wide range of horizontal positions. In order to orient the propeller 103 after the proper horizontal plane of operation is selected, I provide orientation control boxes 74 connected with the journals 40 of the shiftable frame carrier 52.

Figs. 12 and 15 show different oriented positions of the propulsion means effected by the three dimensional control system. On aircraft or submarines, doors might be provided at top and bottom of the compartment as well as at the sides in order to provide free scope for the three-dimensional propeller driving in both vertical and horizontal planes.

Figs. 17-21 show another modified form of my invention in which the floatable body containing compartment 96 is provided with an interiorly arranged frame structure 41 supporting the annular frame 42 in which the angularly shiftable frame carrier 52 is pivotally mounted on a substantially vertical axis provided by journals 52a extending from frame carrier 52 into the annular frame 42. A four blade propeller 102 is mounted for rotation within the shiftable frame carrier 52 under control of electrically operated driving motors 103. Driving motors 103 have flexible leads extending therefrom through the upper compartment of the floatable body to the control position. The flexible leads allow displacement of the motors 103 for a sufficient angular distance to allow the propeller 102 to be readily adjusted to the selected operating plane. In order to adjust the shiftable frame carrier 52 from a remote control position, I provide a gear 43 connected to one of the pivot members which extend from the shiftable frame carrier 52. A pinion 44 meshes with gear 43 and is adjustable through control shaft 45 for moving driving gear 43. The conductors leading to the motors 103 are collected and carried through a compact cable to the control position.

The compartment 96 is provided with an arrangement of door closures comprising sliding doors 46 confined to move in guide rails 46a under control of pinions 46c which mesh with rack teeth 46b formed in the doors 46. The pinions 46c are carried by drive shaft 47 which is driven through pinions 48 through an adjustable control shaft 49 operative from the control position through suitable shafts or remotely controlled motors.

It will be seen that the entire shiftable frame carrier 52 is controllable in position to selectively determine the plane of movement of the propeller 102 with respect to the beam of the vessel. The ability to selectively determine the plane of operation of propeller 102 is highly important in the maneuvering of vessels within limited areas. When it becomes desirable to close the housing, propeller 102 is angularly shifted by moving shiftable frame carrier 52 until the blades of the propeller lie wholly within the confines of the side walls of the hollow rudder at which time, sliding doors 46 may be closed by operation of control shaft 49, operating gear system 48 from the remote position, moving pinions 46c which engage rack teeth 46b for effecting the closing of the sliding doors 46 as illustrated in Figs. 18 and 20.

In Figs. 22-25, I have shown the application of the structure of my invention to the stern of a vessel 1. In this arrangement the structure facilitates the maneuvering and navigation of the vessel by forces imparted adjacent the rear of the vessel. The structure comprises a floatable body divided into upper and lower compartments by horizontally extending partition 111. The lower compartment is divided into two separate compartments 112 and 114 by partition 113 with a buoyant compartment 115 below. The upper compartment 116 is watertight and improves buoyancy of the structure. A bulkhead is provided in the forward end of the structure as shown at 117 which conforms in shape with the shape of the stern of the vessel and makes intimate surface abutment therewith, in a position above the rudder 4 and usual propeller 3. Lugs 118, 119, 120 and 121 extend from opposite sides of the floatable structure and are connected through cables or chains 122, 123, 124 and 125 with tensioning and securing means inside the vessel, such as windlasses similar to those shown in Fig. 10 at 28, 29, 30 and 31. Compartments 112 and 114 are each provided with sea water control doors 112a; 112b; 114a; and 114b, the position of which may be remotely controlled from the pilot's position.

Each compartment houses an orientable propelling mechanism similar to that described in Figs. 9-11 for driving propeller 102 in a selected plane effective against the sea water for navigating the vessel. Similar parts of the orienting mechanism have been given reference characters corresponding to the similarly numbered parts in Figs. 9-11.

Fig. 26 shows the application of my invention to a salvaging vessel, comprising floatable body 126 divided into compartments 127, 128 and 129 and having a rudder 130 connected therewith. One end of the salvaging vessel is shaped at 131 to directly embrace the hull of the vessel being salvaged. Orientable propelling mechanism 132 is mounted in the rudder 130 and orientable propeller mechanism 133 is supported in compartment 128 and connected through cables 134 that may extend to a power source on an adjacent vessel. Adjustable doors 128a and 128b control the ingress and egress of sea water to the propelling mechanism 133 in compartment 128. Compartment 127 contains a windlass 135 which controls the block and tackle grapple system 136 operating in conjunction with guide drum 137 by which salvaging operations may be carried on from the salvaging vessel while the vessel is being maneuvered and navigated under control of the orientable propelling mechanism.

I may arrange the auxiliary propulsion means in compartments in spaced positions along the vessel as illustrated in Figs. 27-29. In this arrangement, the hull of the vessel 1 is provided with port and starboard compartments 10 and 11 within which the separate propulsion means 12, 12a and 12b; and 14, 14a and 14b are located. Separate driving means for the propulsion means 12, 12a and 12b; and 14, 14a and 14b may be provided as indicated by motors 108 in Fig. 29 or the propulsion means may be driven from a position within the vessel. In the port compartment 10, I provide a forward streamline door 17 and a rear streamline door 18 which may be opened and closed through suitable remote control mechanism from a control position within the vessel. In the starboard compartment 11, I provide corresponding forward and rear streamline doors which may be selectively opened or closed in order to facilitate maneuvering and propulsion of the vessel. For purposes of explaining my invention I have illustrated one compartment containing one orientable propelling mechanism and another compartment containing a pair of orientable propelling mechanisms which may be rendered effective or ineffective by closing the associated streamline door. Other methods of locating these separate compartments in spaced positions may be employed, for example, in the sides of the hull similar to the arrangements in the bow and stern illustrated in Figs. 2, 3 and 4. The orientation means for effectively directing the propulsion means in a suitable position for the proper maneuvering of the vessel is employed as heretofore described and I have accordingly indicated like parts by corresponding reference characters.

In Figs. 30-33 I have shown an application of my invention to a marine tractor constructed to provide larger propulsion force than is obtainable in the forms of my invention heretofore described. The floatable body is shown at 138 comprising compartments 139, 140, 142, 143 and 144. In compartment 142 I arrange a multiplicity of orientable propulsion mechanisms shown arranged in tandem at 145 and 146. The orientable propulsion mechanisms are similar in arrangement to the orientable propulsion mechanisms illustrated in Figs. 4, 27 and 29 and may be remotely controlled from the pilot's position on the vessel. The sea water is admitted to the compartment 142 through streamlined closable doors 138a, 138b, 138c and 138d. The attachment means by which the floatable body 138 is secured to the hull of a vessel comprises a pair of wing-like compartments 153 and 154 which are pivotally mounted with respect to a vertically arrange pintle 147 supported in brackets 148 supported adjacent the top and bottom of the floatable body 138. The wing-like compartment 154 terminates in sleeve 154a while wing-like compartment 153 terminates in sleeve-like portions 153a through which the vertically extending pintle 147 passes. Lever member 149 is secured to pintle 147 by which angular movement may be imparted to wing-like compartment 154. Lever member 150 is secured to an extension of sleeve-like member 153a by which wing-like compartment 153 may be angularly shifted. An operative by swinging lever members 149 and 150 may shift the wing-like compartments into a position for embracing opposite sides of the hull of a vessel, after which the wing-like compartments may be secured to the hull of a vessel by chains or cables as heretofore explained in connection with Figs. 9 and 10 and 22 and 24. Each of the wing-like compartments 153 and 154 contain orientable propelling devices 151 and 152 which are comparable to the orientable propelling devices illustrated in Figs. 4, 9-11, 22-25 and 27-29. One or more streamlined doors are provided in the side walls of the wing-like compartments 153 and 154 as illustrated at 153b and 154b. The orientable propelling mechanism 151 and 152 is remotely controlled through cables 151a and 152a which lead to the power source on the vessel. The orientable propelling mechanism 153 and 154 is similarly remotely controlled through cables 146a and 145a. The wing-like compartments 153 and 154 when securely anchored to the hull of a vessel are then laced through chains or cables 155 with respect to the floatable body 138 so that the wing-like compartments are maintained in positive spaced relation with respect to the floatable body 138. The wing-like compartments 153 and 154 are sectionalized into upper and lower floatable sections and the intermediate propelling mechanism sections as shown. To facilitate the throwing of the sea water to opposite sides through the openings provided by doors 138b and 138d on doors 138a and 138c, I provide bulkheads 181 and 182, respectively, which serve to direct the water acted upon by the orientable propellers 145 and 146.

The propelling mechanism is subject to orientation throughout wide range and may include the driving source directly associated therewith as illustrated in Figs. 34-37. In Fig. 34 I have shown the propeller 3 journaled in a rotatable casing 156 which may be revolved between bearings 157 and 158 to permit the propeller to occupy different vertical planes. In this arrangement, the floatable body comprises compartments 159, 160 and 161 with the driving motor disposed in compartment 159 as represented at 162. This driving motor 162 may be of any kind. The driving motor as illustrated in Fig. 34 drives shaft 163 for imparting motion to propelling mechanism 3.

In Fig. 35 I have shown an arrangement in which an electric motor 164 is provided directly within the rotatable member 156 and is connected through conductors 165 with any suitable source of power. In each instance, the entire casing 156 may be angularly shifted under control of lever 166 operating through sleeve 167 whereby the propelling mechanism 3 may be shifted to different angular positions.

In Fig. 36 I have illustrated an arrangement of steam engine for driving the propelling mechanism 3. In the floatable body, separate compartments are provided as indicated at 168, 169, 160 and 161. The propelling mechanism 3 operates in compartment 160 and is journaled within tubular member 170 which is rotatable in various vertical planes between bearings 157 and 158 under control of ring gear 171 engageable by gear 172. Gear 172 may be operated through any suitable control extending from shaft 173. The entire steam engine represented by cylinder 174 is rotatable with tubular member 170 journaled at the top in bearing 175. The steam engine comprises piston 176 operating under control of steam admitted through steam line 177. The piston rod of piston 176 connects to cross head 178 which drives the crank 179 through connecting rod 180 for operating the propeller mechanism 3. By this arrangement the propelling mechanism may be shifted into various angular positions to be rendered most effective for propelling the vessel.

I have shown my invention in various embodiments and have illustrated the same particularly in connection with vessels. I desire that it be understood that all of the principles of the orientable propellers of my invention are equally applicable in aircraft systems. While I have described and illustrated certain preferred embodiments of my invention, I desire that it be understood that modifications may be made and that no limitations are intended other than are imposed by the scope of the appended claims.

What I claim as new and desire to secure by Letters Patent of the United States is as follows:

1. Mechanism for maneuvering vessels comprising in combination with the hull of a vessel, a recessed bow portion disposed below the water line of the hull in retracted relation to the leading edge of the bow of the vessel, a streamlined bulkhead forming the rear wall of the recessed bow portion for directing the discharge of water entering the recessed bow portion, propeller mechanism disposed in said recessed bow portion intermediate said streamlined bulkhead and the leading edge of the bow of the vessel, said propeller mechanism being located on an axis coincident with the longitudinal axis of the vessel, means for driving said propeller mechanism, and means for orienting said propeller mechanism in selected planes for directing thrust forces outwardly in selected directions through the volumetric entry and egress of water with respect to said recessed bow portion.

2. Mechanism for maneuvering vessels comprising in combination with the hull of a vessel a recessed bow portion disposed below the water line of the hull in retracted relation to the leading edge of the body of the vessel, the rear wall of the recessed portion tapering into streamlined connection with the hull of the vessel whereby said recessed portion extends symmetrically on opposite sides of the central longitudinal axis of the vessel, propeller mechanism disposed in said recessed portion intermediate the rear wall thereof and the leading edge of the bow of the vessel and means for orienting said propeller mechanism in selected planes for exerting thrust forces in selected directions outwardly through the volumetric entry and discharge of water in said recessed bow portion.

HENRY C. BRIGGS.